United States Patent [19]
Tomioka

[11] Patent Number: 6,008,600
[45] Date of Patent: Dec. 28, 1999

[54] CONTROL METHOD AND CONTROL APPARATUS FOR ELECTRIC POWER PUMP TYPE POWER STEERING SYSTEM

[75] Inventor: Eiichi Tomioka, Saitama-ken, Japan

[73] Assignee: Jidosha Kiki Co., Ltd., Tokyo, Japan

[21] Appl. No.: 08/922,932

[22] Filed: Sep. 3, 1997

[30]     Foreign Application Priority Data

Sep. 4, 1996   [JP]   Japan ..................................... 8-234100

[51] Int. Cl.$^6$ ................................................. H02K 23/00
[52] U.S. Cl. ........................................... 318/254; 318/138
[58] Field of Search .................................. 318/257, 800, 318/801, 807, 811, 816, 817, 254, 138; 363/37, 132, 136

[56]              References Cited

U.S. PATENT DOCUMENTS 4,435,673   3/1984   Hagino et al. ........................... 318/254

FOREIGN PATENT DOCUMENTS

| 56-67391 | 6/1981 | Japan | F04B 49/06 |
| 3-143770 | 6/1991 | Japan | B62D 5/04 |
| 4-257770 | 9/1992 | Japan | B62D 5/04 |
| 5-131936 | 5/1993 | Japan | B62D 5/04 |
| 6-263046 | 9/1994 | Japan | B62D 6/00 |
| 6-263052 | 9/1994 | Japan | B62D 6/00 |
| 6-263053 | 9/1994 | Japan | B62D 6/02 |
| 6-293267 | 10/1994 | Japan | B62D 5/04 |

*Primary Examiner*—Robert E. Nappi
*Assistant Examiner*—Rita Leykin
*Attorney, Agent, or Firm*—Townsend and Townsend and Crew LLP; Kenneth R. Allen

[57]                ABSTRACT

A method is provided for controlling an electric power pump type power steering system. In this method, there are provided a brushless motor (1) rotating, when a current is fed to coils, for driving a hydraulic pump of an automotive vehicle, thereby obtaining an assist power; a plurality of upper transistors (Q1) connected to the coils of the brushless motor with a control voltage being higher than a drive voltage of the brushless motor; a plurality of lower transistors (Q2) connected to a connection point between the coils of the brushless motor and the plurality of transistors and connected to each other; a controller (6) for selectively turning on one transistor out of the plurality of upper transistors in order and repeating an operation of selectively turning on one transistor other than the transistor connected to the upper transistor which has been turned on, out of the plurality of lower transistors, thereby feeding the current to the coils for respective phases of the brushless motor; and a capacitor (C1), connected at one terminal to a power source and at the other terminal to each connection point between the upper and lower transistors and the coils, for accumulating a drive energy therein. When the upper transistor is turned off, the other terminal of the capacitor is set at a ground potential so that the drive energy of the upper transistor is accumulated in the capacitor.

14 Claims, 17 Drawing Sheets

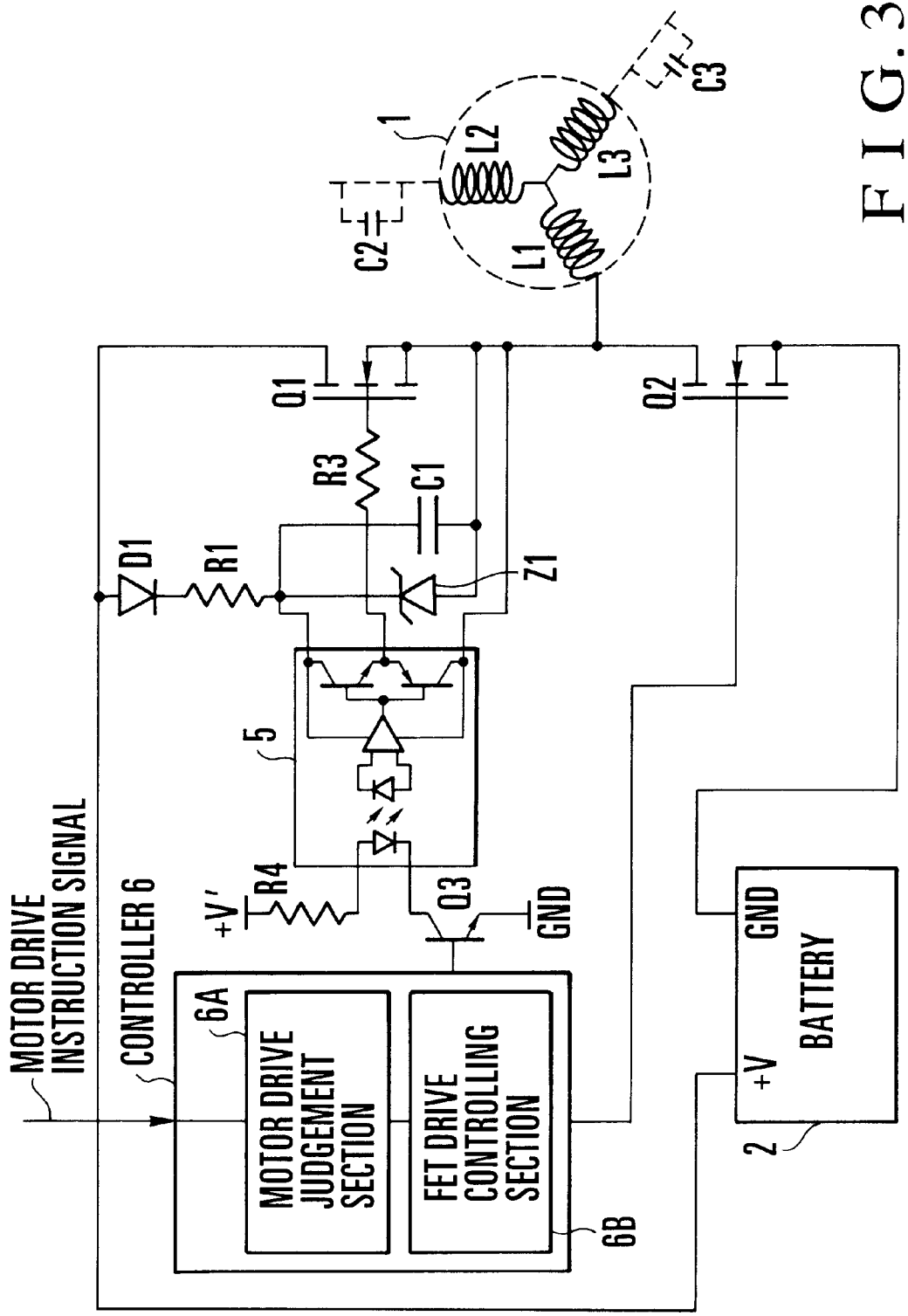
F I G. 3

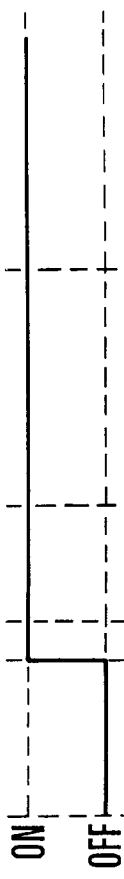
FIG. 8A DRIVER POWER SOURCE
FIG. 8B MOTOR DRIVE INSTRUCTION SIGNAL
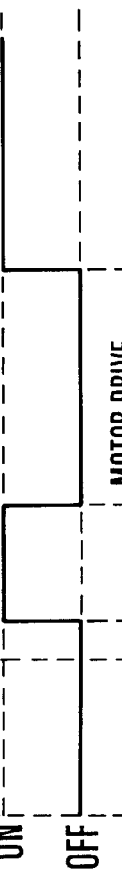
FIG. 8C MOTOR DRIVE
FIG. 8D UPPER TRANSISTOR Q1
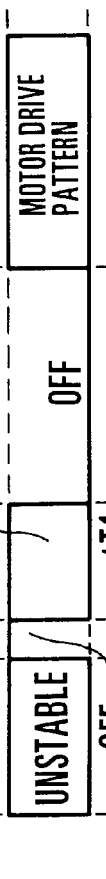
FIG. 8E LOWER TRANSISTOR Q2

CONTROL METHOD AND CONTROL APPARATUS FOR ELECTRIC POWER PUMP TYPE POWER STEERING SYSTEM

Background of the Invention

The present invention relates to a control method and a control apparatus for an electric power pump type power steering system in which a brushless motor is used to drive a hydraulic pump.

In general, in an electric power pump type power steering system used in a vehicle, an electric motor drives a hydraulic pump in response to a vehicle running conditions such as a vehicle velocity, and a desired assist force is obtained by the hydraulic pressure of the hydraulic pump.

Conventionally, brush motors have been used in many cases as electric motors to be used in such an electric power pump type power steering system. However, in view of the fact that a friction is generated in brushes in contact with rectifiers and it is necessary to periodically inspect and maintain the brushes, brushless motors that dispense with brushes have recently been used.

FIG. 17 is a view showing a structure of a driver for driving such brushless motors, in which reference numeral 1 denotes a three-phase brushless motor, reference numeral 2 denotes a battery, reference numeral 3 denotes a DC-DC convertor, reference numeral 4 denotes a gate driver circuit, and reference characters Q1 and Q2 denote field effect transistors (FETs) for supplying armature coils L of the brushless motor 1 with electricity.

Incidentally, in FIG. 17, there is shown an example of drive for a single phase out of the three ones of three-phase brushless motor. The systems for the other two phases are driven by the same structures. Also, in the drawings described hereinafter, the description is made in the same manner.

In this case, in the case where the motor 1 is driven, due to the fact that in some drive conditions a current is caused to flow from a terminal +V of the battery through the upstream transistor Q1 to the motor coil and in other drive conditions a current is caused to flow from the motor coil through the downstream transistor Q2 to a terminal GND of the battery, the transistor Q1 is referred to as an upper transistor and the transistor Q2 is referred to as a lower transistor.

Namely, in the case where the brushless motor 1 is driven, first of all, the upper transistor Q1 is turned on, and thereafter the other lower transistor (not shown) is turned on, whereby a current is caused to flow in a direction from armature coils L1 to L2 for the armature coils L1 and L2, for example. Subsequently, after the upper transistor Q1 is turned off, the upper transistor (not shown) is turned on and at the same time the lower transistor Q2 is turned on, whereby a current is caused to flow in a direction from the armature coils L2 to L1 for the armature coils L1 and L2. Thus, the current is caused to flow to thereby rotate the motor 1 by changing, in order, the directions for the armature coils L1 to L3 by the respective transistors Q1 and Q2 and the other transistors (not shown). By the way, in the case where the motor 1 is driven, the upper transistor Q1 and the lower transistor Q2 connected in series with the upper transistor Q1 are controlled not to be turned on simultaneously.

By the way, in the case where an N-channel element like the field effect transistor Q1 is used as the upper drive element of the brushless motor 1, it is necessary to set, at a higher voltage level, the control voltage that is a gate voltage than the drive voltage that is a source voltage. For this reason, in the example shown in FIG. 17, the DC-DC convertor 3 is used to thereby increase the gate voltage of the field effect transistor Q1. Namely, when an instruction for turning the transistor Q1 on is executed by a gate drive signal, the gate driver circuit 4 applies +voltage of a terminal OUT of the DC-DC convertor 3 to a point between the gate and source of the transistor Q1.

Thus, in the conventional brushless motor driver, in the case where the control voltage of the upper transistor is set at a higher voltage than the drive voltage, the DC-DC convertor is used. However, this DC-DC convertor normally operates during the period when the brushless motor driver operates, this is not preferable in an energy efficiency point of view. Also, since the DC-DC convertor has to be provided for every driver circuit of the three-phases of the DC-DC convertor, there are problems that the structure thereof is complicated, and also that the system is expensive.

SUMMARY OF THE INVENTION

Accordingly, an object of the present invention is to provide a simple and less expensive structure for a driver for driving a brushless motor of a power steering system. Also, another specific object of the invention is to reduce a power consumption of the brushless motor driver.

In order to attain these objects, according to the present invention, there is provided a method for controlling an electric power pump type power steering system which comprises: a brushless motor rotating, when a current is fed to coils, for driving a hydraulic pump of an automotive vehicle, thereby obtaining an assist power; a plurality of upper transistors connected to the coils of the brushless motor with a control voltage being higher than a drive voltage of the brushless motor; a plurality of lower transistors connected to a connection point between the coils of the brushless motor and the plurality of upper transistors and connected to each other; a controller for selectively turning on one transistor out of the plurality of upper transistors in order and repeating an operation of selectively turning on one transistor other than the transistor connected to the upper transistor which has been turned on, out of the plurality of the lower transistors, thereby feeding the current to the coils for respective phases of the brushless motor; and a capacitor, connected at one terminal to a power source and at the other terminal to each connection point between the upper and lower transistors and the coils, for accumulating a drive energy therein; wherein when the upper transistor is turned off, the other terminal of the capacitor is set at a ground potential so that the drive energy of the upper transistor is accumulated in the capacitor.

Also, it is a method that a switch is cooperated with an automotive key switch for starting an engine of a vehicle, and the switch is controlled to be closed so that the other terminal of the capacitor is set at the ground potential.

Also, it is a method that the switch that is kept in the closed condition is brought into an open condition after a predetermined period of time.

Also, it is a method that when an inoperative condition of the engine is kept on for a predetermined period of time after the opening/closing of the switch, the switch is controlled to be closed.

Also, it is a method that an inoperative condition of the brushless motor is kept on for a predetermined period of time after a start-up of the engine, the switch is controlled to be closed.

Also, there is provided a control means for accumulating a drive energy in the capacitor. When the upper transistor is turned off, the other terminal of the capacitor is set at a ground potential by the control means so that the drive energy of the upper transistor is accumulated in the capacitor.

Further, the control means has a switch cooperated with an automotive key switch for starting an engine of a vehicle, for controlling the switch to be closed so that the other terminal of the capacitor is set at the ground potential.

According to the control means, the control means brings the switch to be opened after a predetermined period of time.

According to the control means, the control means brings the switch to be closed when an inoperative condition of the engine is kept on for a predetermined period of time.

According to the control means, the control means brings the switch to be closed when an inoperative condition of the brushless motor is kept on for a predetermined period of time after a start-up of the engine.

According to the control means, the switch is controlled to be closed so that the other terminal of the capacitor is set at the ground potential when the lower transistors are in PWM operation.

The control means turns the lower transistors on when the upper transistor is turned off so that the other terminal of the capacitor is set at a ground potential to thereby charge the capacitor.

Also, the control means turns the upper transistor off and the lower transistor on in cooperation with an automotive key switch for starting an engine of a vehicle.

Also, the control means turns off the lower transistor that has been turned on after a predetermined period of time. Also, the control means turns on the lower transistor when an inoperative condition of the engine is kept on for a predetermined period of time.

Also, the control means turns on the lower transistor when an inoperative condition of the brushless motor is kept on for a predetermined period of time after a start-up of the engine.

BRIEF DESCRIPTION OF THE DRAWINGS

In the accompanying drawings:

FIG. 3 is a block diagram showing a second embodiment of the invention;

FIG. 8 is a timing chart showing an operation of the apparatus shown in FIG. 7;

DESCRIPTION OF THE PREFERRED EMBODIMENTS

The present invention will now be described with reference to the accompanying drawings.

Figure 1:
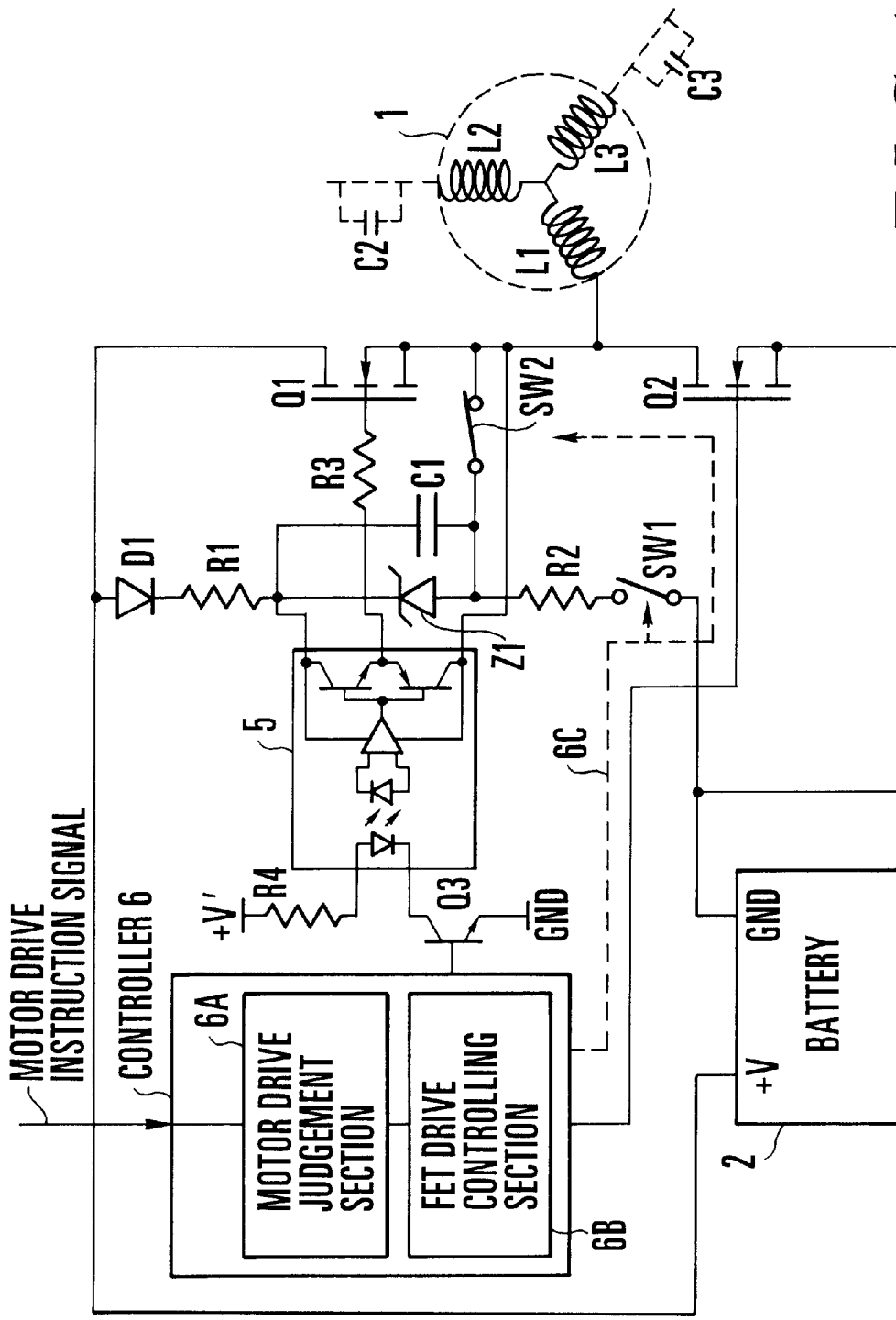
FIG. 1 is a block diagram showing a first embodiment of the invention.

FIG. 1 is a block diagram showing a structure of a brushless motor driver used in an electric power pump type power steering system according to the present invention.

In FIG. 1, the brushless motor driver includes a three-phase brushless motor 1, a battery 2 that is a drive source of the brushless motor 1, a photocoupler 5, a controller 6 for driving and controlling the brushless motor 1, an upper field effect transistor Q1 and a lower field effect transistor Q2 for driving the brushless motor 1, a capacitor C1 for charging a drive energy for the upper transistor Q1, and switches SW1 and SW2 for performing the charge and discharge of the capacitor C1. Incidentally, the controller 6 is composed of a motor drive judgement section 6A for making the drive judgment for the motor 1 in accordance with an input of the motor drive instruction signal, and an FET drive controlling section 6B for performing the drive and control of the field effect transistors (FETS) Q1 and Q2 in accordance with an output from the motor drive judgement section 6A on the basis of a motor rotor positioning sensor signal (not shown).

In this case, in FIG. 1, there is shown an example of drive for a single phase out of three ones of three-phase brushless motor 1. The systems for the other two phases are driven by the same structure. Also, in the drawings described hereinafter, the description is made of a structure of single phase in the same manner.

In the case where the brushless motor 1 is driven, after the upper transistor Q1 on the upstream side has first been turned on by the sensor signal of the motor rotor position (not shown), the other lower transistor (not shown) on the downstream side is turned on, whereby the current is caused to flow in a direction from L1 to L2 for the armature coils L1 and L2, for example. Subsequently, after the transistor Q1 has been turned off, the upper transistor (not shown) is turned on, and at the same time, the lower transistor Q2 is turned on so that a current is caused to flow in a direction from L2 to L1 for the armature coils L1 and L2. Thus, the current is caused to flow to thereby rotate the motor 1 by changing, in order, the directions for the armature coils L1 to L3 by the respective transistors Q1 and Q2 and the other transistors (not shown).

By the way, if an N-channel field effect transistor is used as the upper transistor Q1, it is necessary to set, at a higher voltage level, a gate voltage than a source voltage of transistor Q1. For this reason, in the brushless motor driver, a capacitor C1 and a Zener diode Z1 are connected in parallel, and one terminal of the capacitor C1 connected on a cathode side of the Zener diode Z1 is connected to the source (+V) of the battery 2 through a resistor R1 and a diode D1. Furthermore, the other terminal of the capacitor C1 connected in parallel to the anode side of the Zener diode Z1 is connected to the drain side of the transistor Q1 through the switch SW2 or the ground (GND) of the battery 2 through a resistance R2 and the switch SW1. Then, while the upper transistor Q1 is turned off, the energy is charged by which the capacitor C1 reaches the Zener voltage of the Zener diode Z1 from the battery 2 through the diode D1 and the resistance R1. Thereafter, at the time when the upper transistor Q1 is turned on, the charged energy of the capacitor C1 is given as a gate/source voltage of the upper transistor Q1 through the photocoupler 5 so that the gate voltage that is higher than the source voltage is given to the upper transistor Q1 to thereby turning the upper transistor Q1 on.

The charge and discharge of the thus described capacitor C1 is performed by the opening/closing operation of the switches SW1 and SW2 as described above. Namely, if the other terminal of the capacitor C1 connected to the anode side of the Zener diode Z1 by closing the switch SW1 is connected to the ground (GND) to thereby charge the capacitor C1, whereas if the other terminal of the capacitor C1 is connected to a series connection point of the transistors Q1 and Q2 by closing the switch SW2, thereby discharging the capacitor C1. Incidentally, the opening/closing control of the SW1 and SW2 is performed by the FET driver controlling section 6B within the controller 6.

Figure 2:
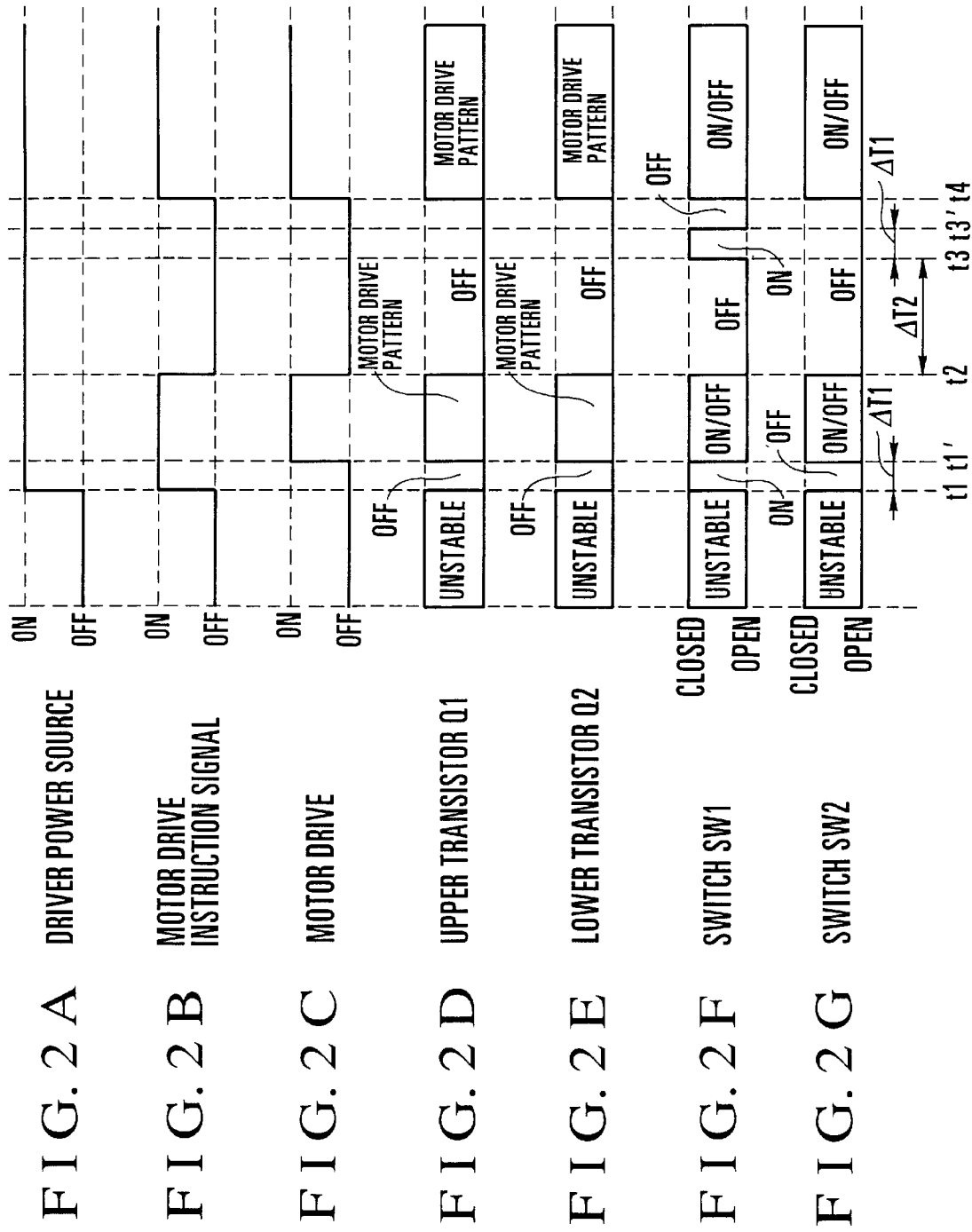
FIG. 2 is a timing chart showing an operation of each part of the apparatus shown in FIG. 1.

The operation of the primary part of the brushless motor driver thus described will now be described on the basis of the timing chart shown in FIG. 2.

First of all, at time t1, when a switch (not shown) is closed so that a power of electric source is supplied from the battery 2, a motor drive instruction signal is given to the controller 6 (see FIGS. 2(a) and 2(b)). In this case, the FET drive controlling section 6B within the controller 6 is ready without directly driving the motor 1 for a period of time ΔT1. Accordingly, as shown in FIGS. 2(d) and 2(e), the upper transistor Q1 and the lower transistor Q2 are both turned off. At this time, as shown in FIGS. 2(f) and 2(g), during a period ΔT1 immediately after the turning-on of the power source, the switches SW1 and SW2 are controlled to be closed and opened, respectively, through a control line 6C. The other terminal side of the capacitor C1 connected to the anode side of the diode Z1 is used as a ground level, and a current is caused to flow from the battery 2 to one terminal side of the capacitor C1 through the diode D1 and the resistor R1 to charge the capacitor C1.

Subsequently, at the time t1' when a set period ΔT1 has lapsed from time t1, if the motor drive instruction signal still keeps on turning on, the controller 6 applies a motor drive signal addressed to the upper transistor Q1 through a transistor Q3 to the photocoupler 5 on the basis of the motor rotor position sensor signal (not shown). Then, an accumulated energy of the capacitor C1 is given as a gate/source voltage of the upper transistor Q1 through the photocoupler 5 to thereby turn the upper transistor Q1 on to start the rotation of the motor 1. Thereafter, during a period of t2 until the motor drive instruction signal of FIG. 2(b) is turned off, the charge of the capacitor C1 for driving the upper transistor Q1 for the switches SW1 and SW2 and the ON/OFF control for setting the potential at the series connected point of the respective transistors Q1 and Q2 are carried out (FIGS. 2(f) and 2(g)). Also, meanwhile, the respective transistors Q1 and Q2 operate in a motor drive pattern on the basis of the motor drive signal from the controller 6 (FIGS. 2(d) and 2(e)).

Thereafter, at time t2, the motor drive instruction signal is turned off, and the motor drive is also turned off (FIGS. 2(b)

and 2(c)). As a result, the respective transistor Q1 and Q2 are controlled to be turned off and the switches SW1 and SW2 are both controlled to be open condition (FIGS. 2(d) and 2(e)). Then, even at the time t3 when a set period ΔT2 has lapsed from time t2 at which the motor drive instruction signal is turned off, if the motor drive instruction signal still keeps on turning off, until time t3' at which the preset time period ΔT1 has lapsed from the time t3, only the switch SW1 is controlled to be closed condition while the switch SW2 is controlled to be opened, thereby charging the capacitor C1. At time t3', the switch SW1 is opened (FIG. 2(f)).

Thus, in the case where the motor 1 has not been driven for a long time, since the accumulated energy of the capacitor C1 is discharged, the charge of the capacitor C1 is effected in the preset time period ΔT1.

Subsequently, when time is t4 before the preset time period ΔT2 has lapsed from time t3' and the motor drive instruction signal is turned on, onward, until the motor drive instruction signal is turned off, the switches SW1 and SW2 are controlled to be turned on and off for the charge of the capacitor C1 for driving the upper transistor Q1 and setting the potential at the series connected point of the respective transistors Q1 and Q2 in the same way (FIGS. 2(f) and 2(g)). Also, during this period, the respective transistors Q1 and Q2 operate in the motor drive pattern on the basis of the above-described motor drive signal (FIGS. 2(d) and 2(e)).

By thus performing the open/close control of the switches SW1 and SW2, in particular, the energy is accumulated in the capacitor C1 immediately after the turning-on of the power source. As a result, at the start-up of the motor 1, the upper transistor Q1 is driven by the accumulated energy, so that the motor 1 is immediately started up. Also, in the case where the motor 1 has not been used for a long time, the charge of the capacitor C1 is effected during the preset time period ΔT1, so that the motor 1 may immediately be driven at the next drive timing.

Incidentally, it is possible to perform the start control of the motor 1 also in a brushless motor driver shown in FIG. 3 in which the switches SW1 and SW2 are dispensed with. Namely, the FET drive controlling section 6B within the controller 6 turns on all the lower transistors for the three phases including the lower transistor Q2 only in a preset period of time immediately after the turning-on of the power source to the brushless motor driver shown in FIG. 3. At the same time, all the upper transistors for the three phases including the upper transistor Q1 are turned off.

Incidentally, this preset time period is the period during which an energy enough to perform the gate drive of the transistors may be accumulated in the capacitor C1. During this period, even if the motor drive instruction signal is turned on, the motor 1 is not driven. The motor 1 is driven after the lapse of the preset time period.

Also, if the condition where the motor 1 has been stopped for a long time under the condition that the power is supplied to the brushless motor driver, the energy accumulated in the capacitor C1 is discharged. Accordingly, in the same way, it is impossible to start up the motor 1. For this reason, in the same manner as in the motor start-up, the FET drive controlling section 6B within the controller 6 turns on all the transistors for the three-phases for the predetermined period of time, and at the same time turns off all the upper transistors for the three-phases. During this period, the charge is effected to the capacitor C1.

Figure 4:
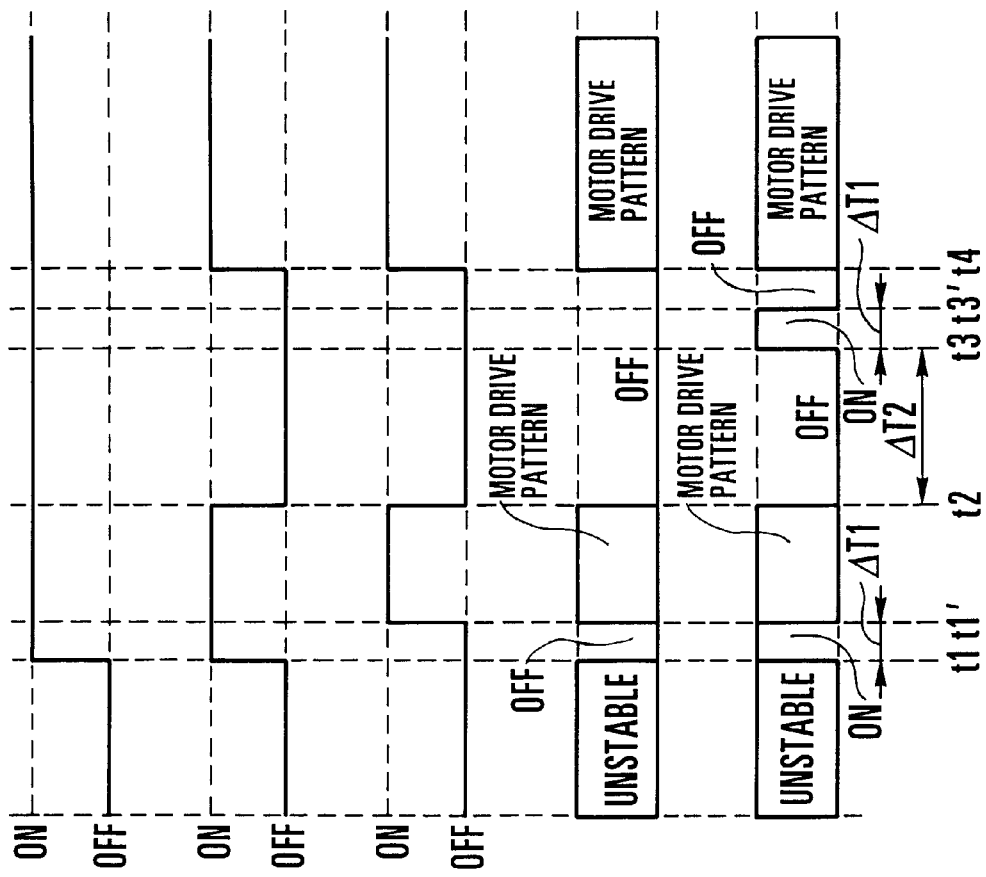
FIG. 4 is a timing chart showing an operation of each part of the apparatus shown in FIG. 3.

The operation of the primary part of such a brushless motor driver will now be described in greater detail with reference to the timing chart shown in FIG. 4.

When the power is supplied to the brushless motor driver at time t1, the motor drive instruction signal is given to the controller 6 (FIGS. 4(a) and 4(b). Incidentally, it is not always required to give the motor drive instruction at the same time with the power-on., In this case, the FET drive controlling section 6B within the controller 6 turns off all the upper transistors including the upper transistor Q1 during the preset time period ΔT1 (FIG. 4(d)) and turns on all the lower transistors including the lower transistor Q2 for this period (FIG. 4(e)). Then, in the driver shown in FIG. 3, during this period ΔT1, since the potential level at the series connected point of the respective transistors Q1 and Q2 is lowered, the energy is accumulated in the capacitor C1 from the battery 2 through the diode D1 and the resistor R1.

Then, at the time t1' at which the preset time period ΔT1 has lapsed from time t1, if the motor drive instruction signal has not yet been turned off, the controller 6 gives the motor drive signal to the respective transistors Q1 and Q2 (FIG. 4(c)). Then, the charged voltage of the capacitor C1 is given to the upper transistor Q1 through the photocoupler 5 so that the upper transistor Q1 is turned on to thereby start up the motor 1. Onward, during a period until time t2 at which the motor drive signal is turned off, the transistors Q1 and Q2 operate in the motor drive pattern on the basis of the above-described motor drive signal from the controller 6 (FIGS. 4(d) and 4(e)).

Thereafter, at time t2, the motor drive instruction signal is turned off and also the motor drive signal is turned off. Thus, the respective transistors Q1 and Q2 are turned off. In this case, even at time t3 at which the preset time period ΔT2 has lapsed from the time t2 at which the motor drive instruction signal is turned off, if the motor drive instruction signal is still turned off, the FET drive controlling section 6B turns off all the upper transistors and turns on all the lower transistors during a period until time t3' at which the preset time period ΔT1 has lapsed from time t3. Thus, in the same manner, the charge of the capacitance C1 is effected. Then, at time t3', all the upper and lower transistors are turned off.

Subsequently, at time t4 before the preset time period T2 has lapsed from time t3', if the motor drive instruction signal is turned on, onward during the period until the motor drive instruction signal is turned off, the respective upper and lower transistors Q1 and Q2 operate on the basis of the motor drive pattern.

Thus, in the start-up of the motor 1 and even after the accumulated energy of the capacitor C1 is expended due to non-use of the motor 1 for a long time, the FET drive controlling section 6B within the controller 6 controls the respective upper and lower transistors in an ON/OFF manner so that it is possible to accumulate a sufficient drive energy in the capacitor C1. As a result, the motor 1 may be driven without fail.

By the way, in the case where an RPM of the motor 1 is controlled, in general, a PWM control is effected to change a duty ratio of an output pulse of the transistors for driving the motor 1. However, if such a PWM control is effected to the lower transistor Q2, there are some cases where a sufficient drive energy is not accumulated in the capacitor C1 in the circuit shown in FIG. 3.

For this reason, the FET drive controlling section 6B within the controller 6 performs the open/close control of the switches SW1 and SW2 shown in FIG. 1 so that a sufficient drive energy may be accumulated in the capacitor C1.

Figure 5:
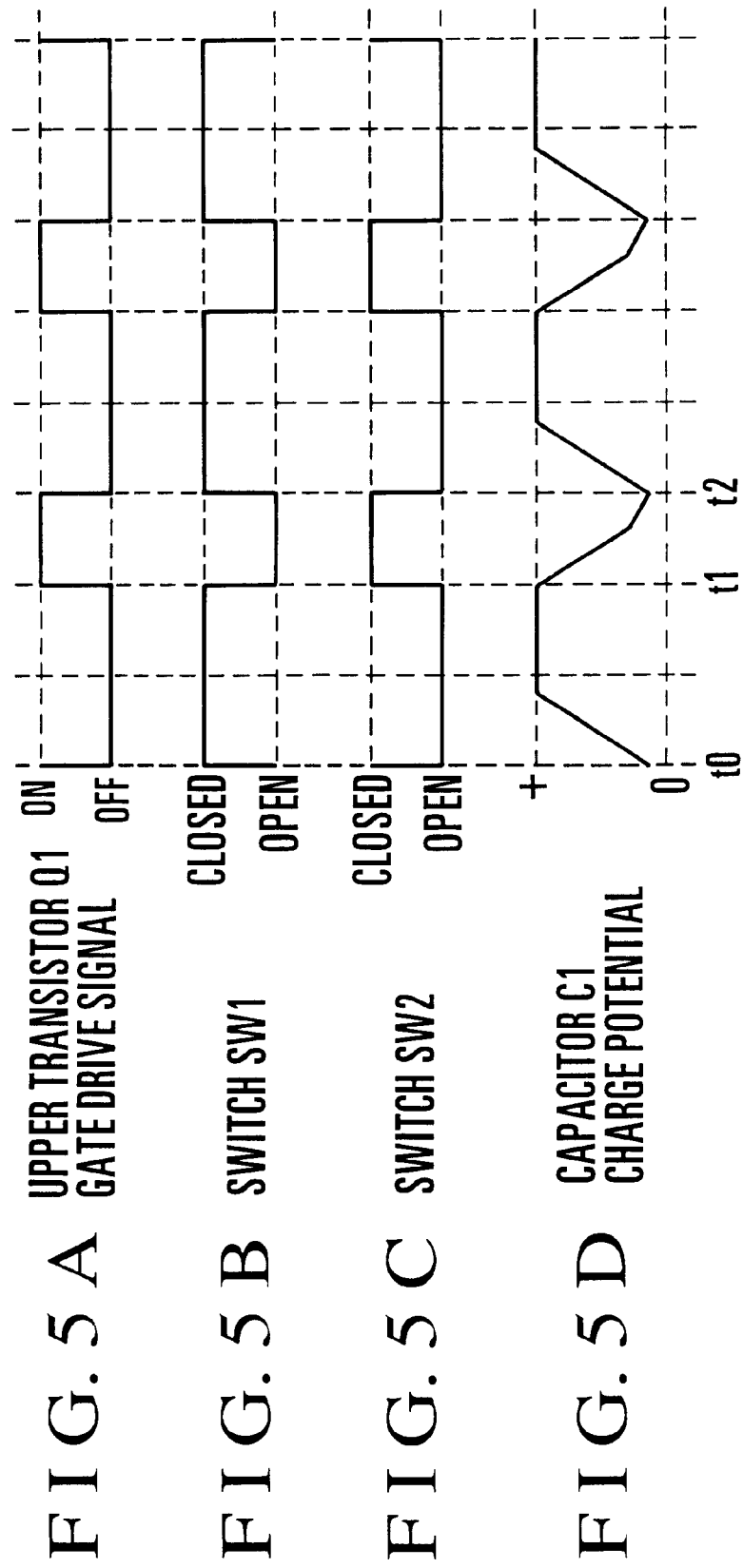
FIG. 5 is a timing chart showing a charging state of a capacitor in PWM operation of the apparatus shown in FIG. 1.

FIG. 5 shows a timing chart showing an energy accumulation condition to the capacitor C1 in the motor start-up by the PWM control. The operation of the FET drive controlling section 6B will now be described in more detail on the basis of the timing chart shown in FIG. 5 and the block diagram shown in FIG. 1.

During a period when the gate drive signal of the upper transistor Q1 shown in FIG. 1 is turned off, i.e., during a period from time t0 to time t1 shown in FIG. 5(a), the switch SW1 is closed and the switch SW2 is opened (FIGS. 5(b) and 5(c)). Then, since the other terminal of the capacitor C1 in FIG. 1 is forcibly brought into a ground level, an energy that reaches the Zener voltage of the Zener diode Z1 is charged to the capacitor C1 from the battery 2 through the diode D1 and the resistor R1 (FIG. 5(d)).

Subsequently, in accordance with the ON instruction of the gate drive signal to the upper transistor Q1, during a period from time t1 to time t2 shown in FIG. 5, the FET drive controlling section 6B controls the switch SW1 to be opened and the switch SW2 to be closed. Then, the energy that has been charged in the capacitor C1 is applied as the gate/source voltage of the upper transistor Q1 through photocoupler 5. Incidentally, from time t2 onward, the above-described operation is repeated. Accordingly, since in the charge to the capacitor C1 in the brushless motor driver the other terminal side of the capacitor C1 is forcibly brought into the ground level, it is possible to charge without depending upon the operation of the lower transistor Q2. Accordingly, even if the lower transistor Q2 performs the PWM operation, a sufficient drive energy may be accumulated in the capacitor C1.

Thus, in the brushless motor driver, the switching operation for the motor drive is utilized in the case where the gate drive voltage of the upper transistor Q1 is obtained. For this reason, in comparison with the case where the gate drive voltage is obtained from the single DC-DC convertor, the structure may significantly be simplified. Also, the operation in which, at the OFF time of the upper transistor Q1, the gate drive energy is accumulated for turning on the upper transistor Q1 at the next time and at the ON time of the upper transistor Q1, the energy is not accumulated in the capacitor C1, is repeated. Accordingly, if an optimum charge/discharge design is attained, it is possible to obtain a gate drive power source with a significantly high efficiency.

Figure 6:
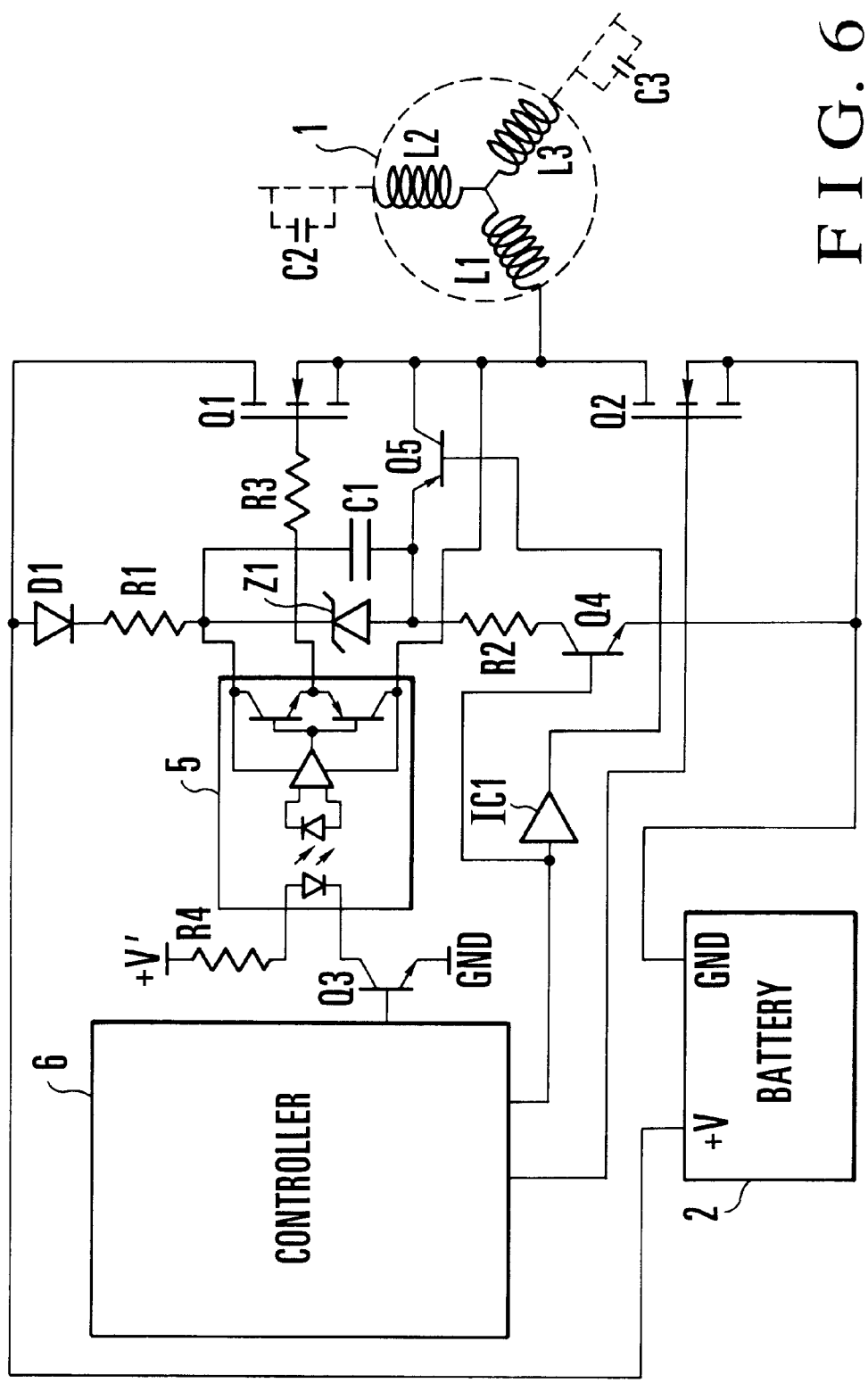
FIG. 6 is a block diagram showing a third embodiment of the invention.

FIG. 6 is a view showing another structural example of the brushless motor driver, in which bipolar transistors Q4 and Q5 are used as the switches SW1 and SW2. Incidentally, it is possible to ensure the same effect even in the case where the field effect transistors are used instead of the bipolar transistors.

Figure 7:
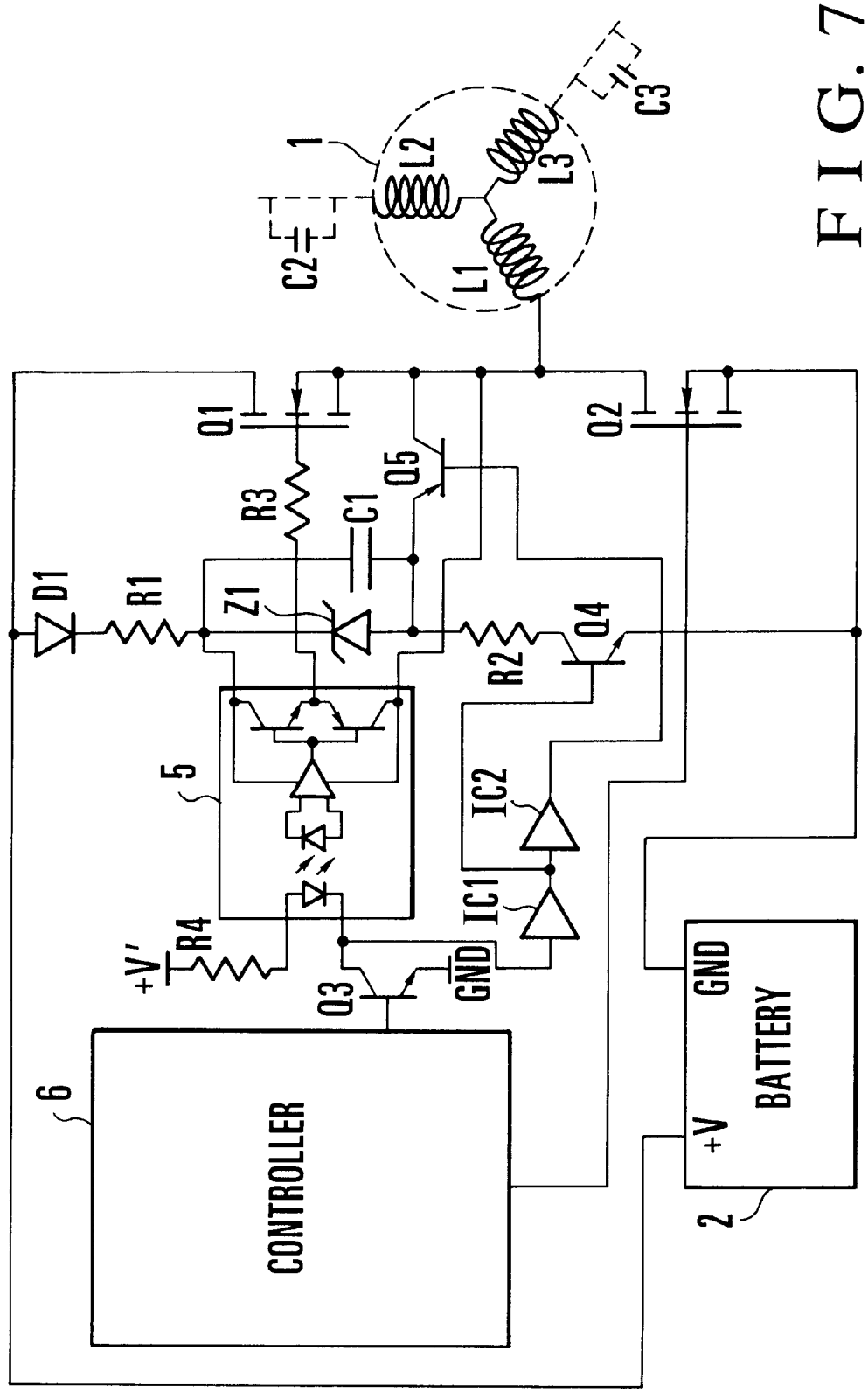
FIG. 7 is a block diagram showing a fourth embodiment of the invention.

Next, FIG. 7 is a view showing still another structural example of the brushless motor driver. FIG. 8 is a timing chart showing the operation thereof. In the circuit shown in FIG. 7, the transistors Q4 and Q5 are used to perform the charge to the capacitor C1 at the OFF time of the upper transistor Q1. Namely, at the OFF time of the upper transistor Q1, the transistor Q4 is turned on and the transistor Q5 is turned off so that the drive energy is accumulated in the capacitor C1. Incidentally, as shown in FIGS. 8(d) and 8(e), in the power-on state, the upper transistor Q1 and the lower transistor Q2 are both turned off to thereby charge the capacitor C1.

Figure 9:
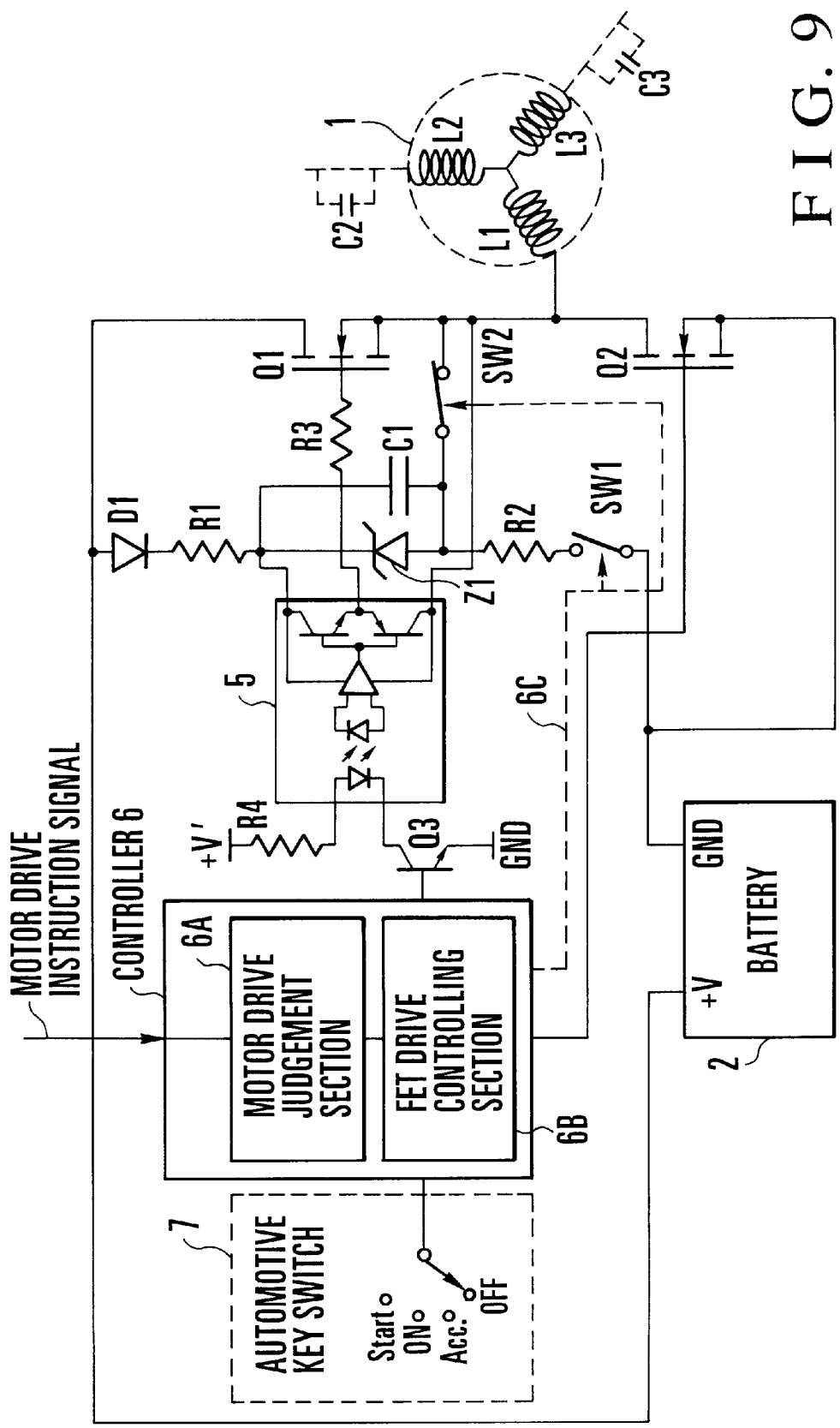
FIG. 9 is a block diagram showing a fifth embodiment of the invention.

Next, FIG. 9 is a block diagram showing a first structural example in the case where the brushless motor driver is applied to an automotive vehicle. An automotive key switch 7 is added to the driver shown in FIG. 1. As is well known in the vehicle key switch 7, one is selected out of four positions, i.e., an OFF position, an Accessary position, an ON position and a Start position. In this case, if the automotive key switch 7 is turned from the OFF position to the Accessary position, a power is fed from a battery 2 to a specific electric system, for example, automotive radio receiving set. Also, if the automotive key switch 7 takes the ON position, the power is fed from the battery 2 to electric systems of the respective parts and the power source is also connected to an ignition system of the engine. Also, when the automotive key switch 7 takes the Start position, the engine is started up.

In the driver shown in FIG. 9, the above-described automotive key switch 7 is connected to the controller 6 so that the energy is accumulated in the capacitor C1 prior to the start-up of the automotive engine. Thus, it is possible to immediately start up the motor 1 of the power steering system because the upper transistor Q1 is driven by the accumulate energy in the capacitor C1. As a result, it is possible to immediately drive a hydraulic pump and it is possible to obtain a desired power assist force by the hydraulic pressure.

The operation of the primary part of the driver shown in FIG. 9 will now be described on the basis of the respective timing charts shown in FIGS. 10 to 12. First of all, the timing chart shown in FIG. 10 will be explained. First of all, when at time t1, the automotive key switch 7 (hereinafter simply referred to as a key switch) takes the Accessary position from the OFF position and the power is fed from the battery 2 to the driver (FIGS. 10(*a*) and 10(*b*)), the FET drive controlling section 6B only closes the switch SW1 during a time period $\Delta$T1 (FIG. 10(*g*)). Thus, the capacitor C1 is charged. Thereafter, at time t1', the switch SW1 is opened, the charge of the capacitor C1 is completed. In this case, if a preset time period $\Delta$T2 has lapsed with the key switch 7 being kept at the Accessary position, the FET drive controlling section 6B closes the switch SW1 during the period $\Delta$T1 (FIG. 10(*g*)) to thereby again charge the capacitor C1.

Next, when the key switch 7 is brought from the Accessary position through the ON position to the Start position, the engine is started up, and at the same time the power is supplied from the battery 2 to the respective automotive parts. Then, the key switch 7 is returned back to the ON position (FIG. 10(*a*)). When the motor drive instruction signal is given to the controller 6 at time t3 (FIG. 10(*c*)), during a time period until t4 at which the motor drive instruction signal is turned off, the FET drive controlling section 6B performs the charge to the capacitor C1 for driving the upper transistor Q1 and the ON/OFF control for setting the potential at the series connected point of the respective transistors Q1 and Q2 for the switches SW1 and SW2 (FIGS. 10(*g*) and 10(*h*)). Also, during this period, the respective transistors Q1 and Q2 operate in the motor drive pattern on the basis of the above-described motor drive signal from the controller 6 (FIGS. 10(*e*) and 10(*f*)), and the motor 1 is driven (FIG. 10(*d*)).

Figure 10:
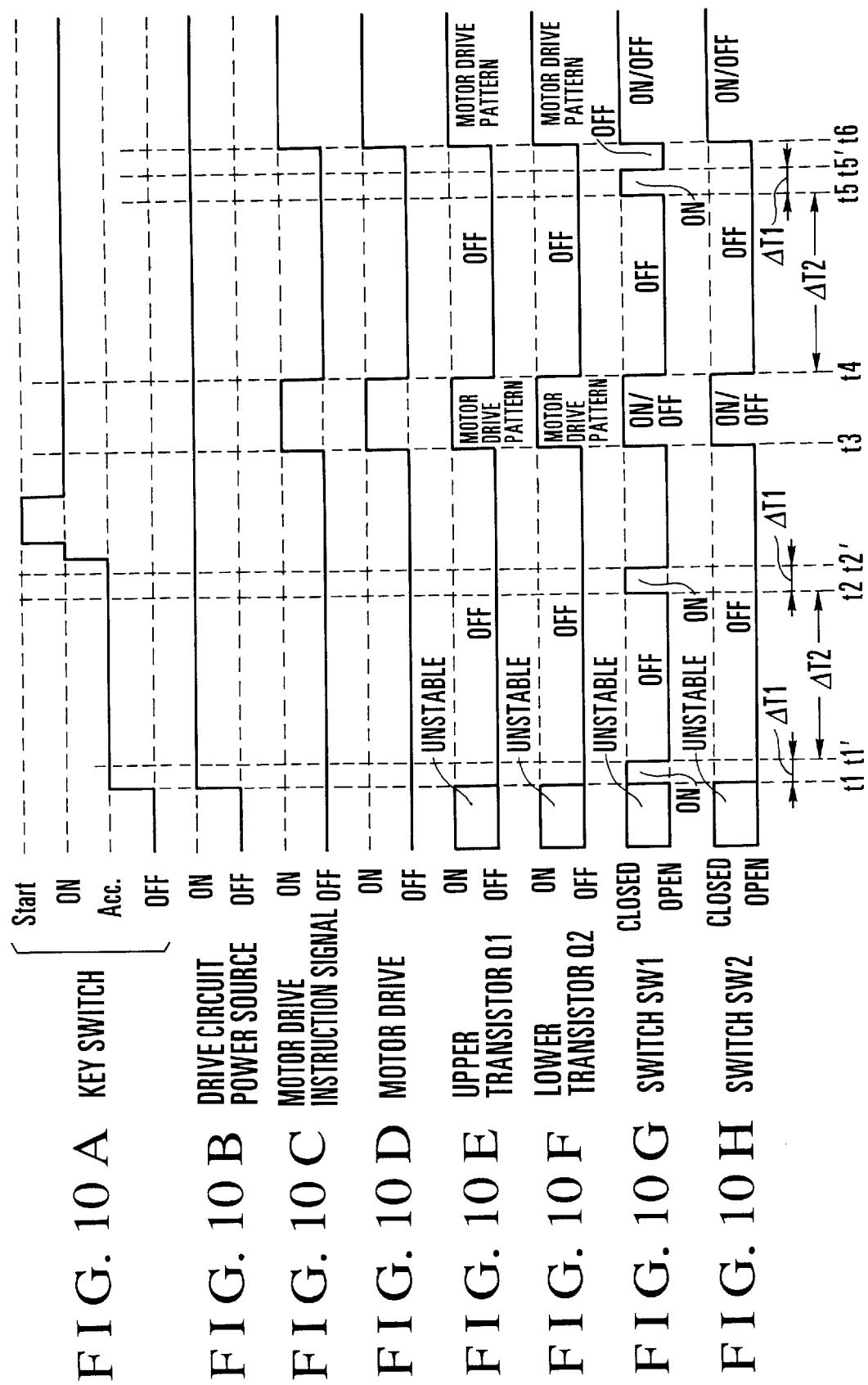
FIG. 10 is a timing chart showing an operation of the apparatus shown in FIG. 9.

Thereafter, at time t4, the motor drive instruction signal is turned off, and the motor drive is also turned off (FIGS. 10(*g*) and 10(*h*)). Thus, the respective transistors Q1 and Q2 are turned off, the switches SW1 and SW2 are both controlled to be opened (FIGS. 10(*e*) and 10(*f*)). Then, if the motor drive instruction signal is still turned off even at a time t5 at which the preset time period $\Delta$T2 has lapsed at the time t4 at which the motor drive instruction signal is turned off, only the switch SW1 is controlled to be closed while the switch SW2 is opened during the preset time period $\Delta$T1. The charge to the capacitor C1 is effected. At time t5', the switch SW1 is opened (FIG. 10(*g*)).

Thus, when the key switch 7 takes the Accessary position, the charge is effected in the capacitor C1 so that the motor 1 may be started up immediately after the engine start. However, since there is a possibility that the operational time period of the audio equipment such as a radio receiving set when the key switch 7 is located at the Accessary position in the engine stop for a long time, the charge is effected periodically in the capacitor C1 by the period $\Delta$T1.

Figure 11:
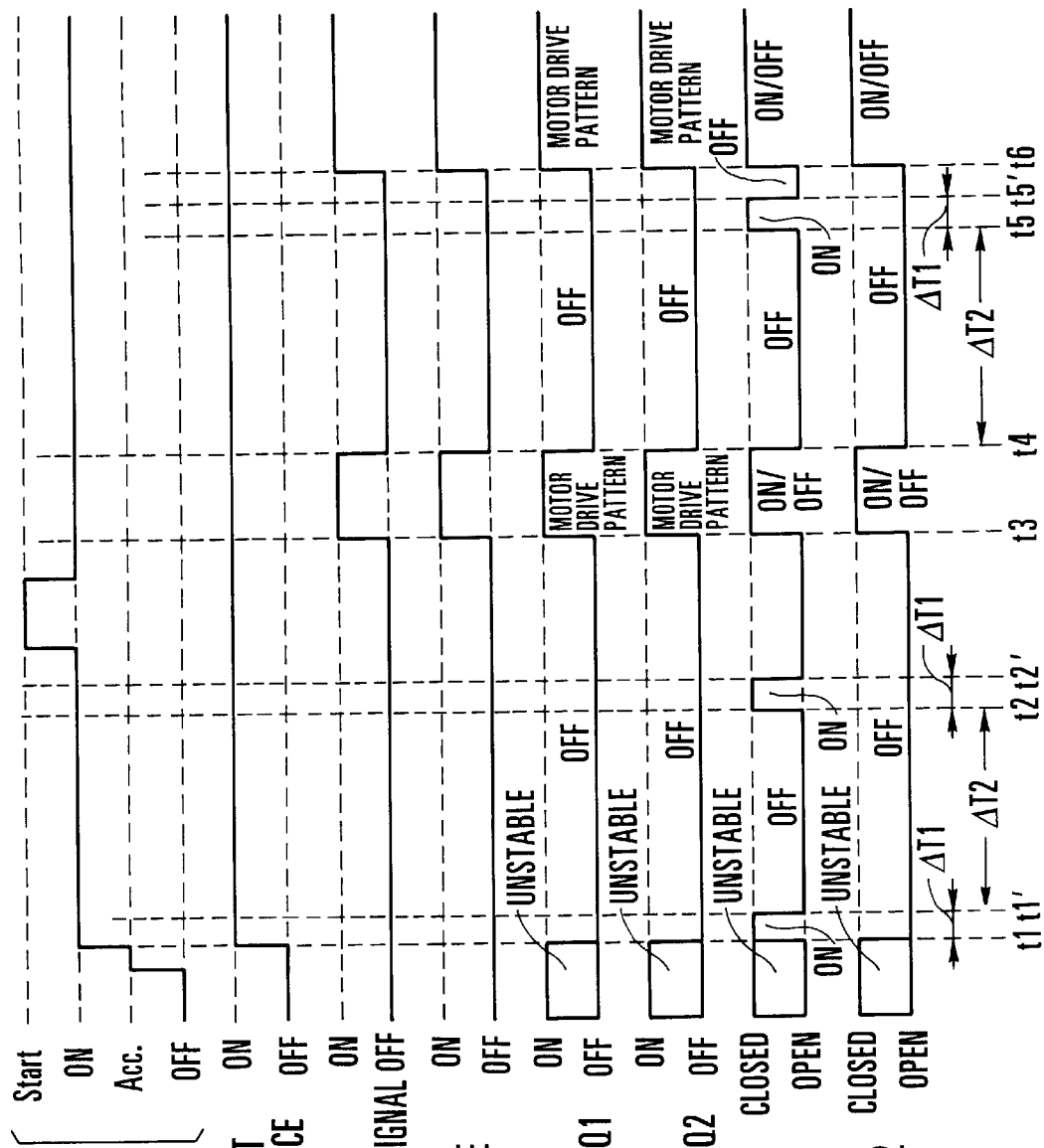
FIG. 11 is another timing chart showing an operation of the apparatus shown in FIG. 9.

Next, the timing chart shown in FIG. 11 shows an operation in the case where the charge is effected to the capacitor C1 when the key switch 7 takes the ON position from the OFF position through the Accessory position. When the key switch 7 takes the ON position at time t1, the power is fed to the driver from the battery 2 (FIGS. 11(*a*) and (*b*)). In this case, the FET drive controlling section 6B only closes the switch SW1 during the time period $\Delta$T1 (FIG. 11(*g*)). Thus, the charge is effected to the capacitor C1. Thereafter, at time t1', the switch SW1 is opened and the charge to the capacitor C1 is completed. Then, when the preset time period $\Delta$T2 has lapsed while the key switch 7 is kept at the ON position, the FET drive controlling section 6B closes the switch SW1 for the time period $\Delta$T1 (FIG. 11(*g*)), thereby again performing the charge to the capacitor C1.

Next, when the position of the key switch 7 is moved from the ON position to the Start position, the engine is started, the power is fed from the battery 2 to the respective automotive parts, and the key switch 7 is returned back to the ON position (FIG. 11(*a*)). Then, when the motor drive instruction signal is given to the controller 6 at time t3 (FIG. 11(*c*)), onward therefrom, the operation that is substantially the same as that of the timing chart shown in FIG. 10 that has already been explained is performed.

When the key switch 7 thus takes the ON position from the Accessory position, the capacitor C1 is charged so that a preparation of the start of the motor 1 is performed prior to the start-up of the engine. The advantage of the operation shown in FIG. 11 over the operation shown in FIG. 10 is that, since the cases where the key switch takes the ON position less frequently happens than the cases where the key switch takes the Accessory position, it is possible to avoid such a waste that the power is fed to the motor controller without starting the engine. Also, there is a possibility that the key switch 7 is kept in the ON position without starting the engine for a long time, the charge to the capacitor C1 is effected periodically only for the time period $\Delta$T1.

Figure 12:
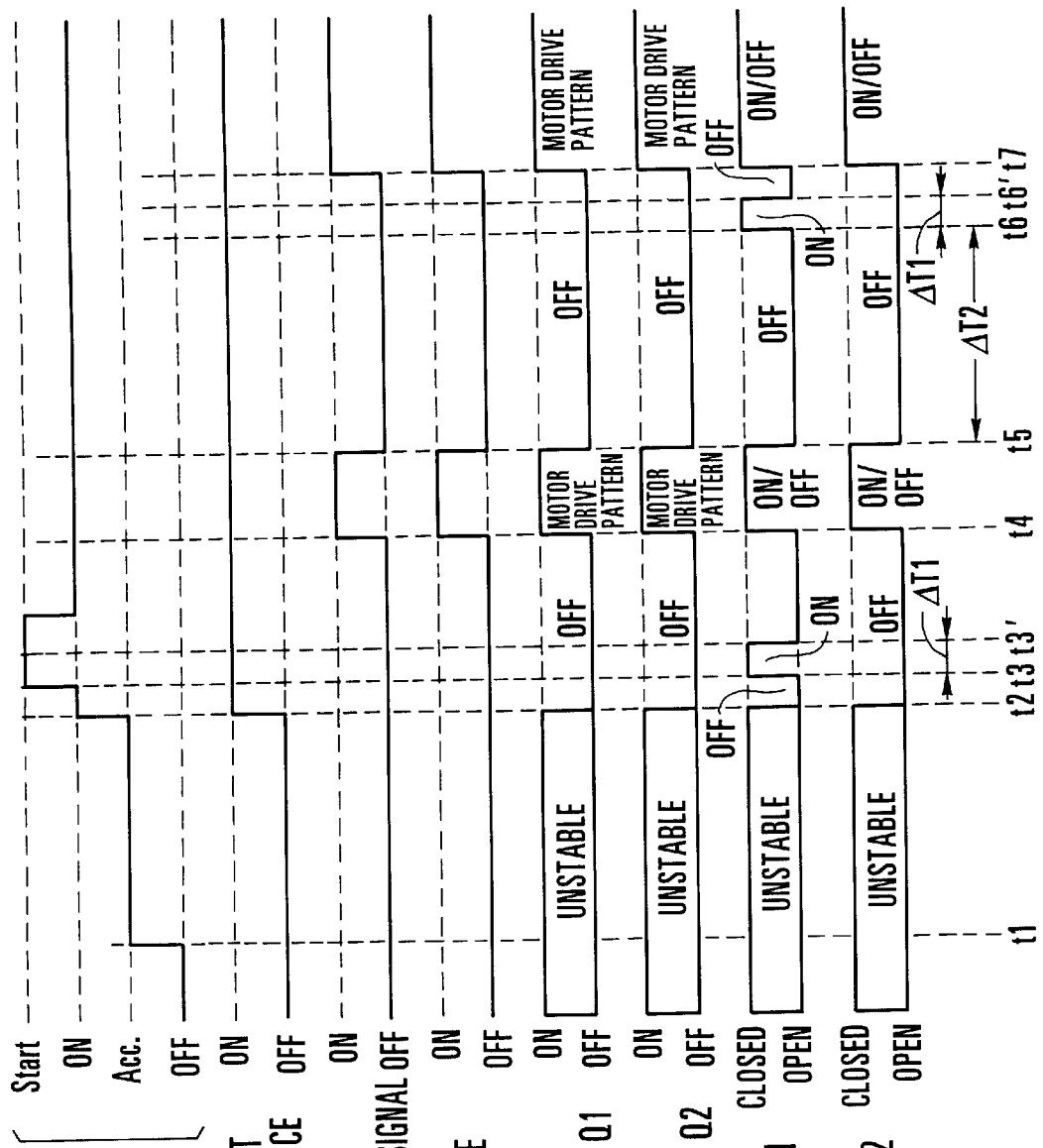
FIG. 12 is yet another timing chart showing an operation of the apparatus shown in FIG. 9.

Next, the timing chart shown in FIG. 12 shows an operation in the case where there is a predetermined period of time from the OFF position to Accessory position of the key switch 7 and thereafter, the charge is effected to the capacitor C1 when the key switch takes the Start position through the ON position. The key switch 7 takes the Accessory position at time t1. Thereafter, when the key switch 7 takes the ON position at time t2, the power is fed from the battery 2 to the driver (FIGS. 12(*a*) and 12(*b*)). Subsequently, the key switch 7 takes the Start position at time t3, the engine is started up, and at the same time the FET drive controlling section 6B closes only the switch SW1 for the time period $\Delta$T1 (FIG. 12(*g*)). Thus, the charge is effected to the capacitor C1. Thereafter, at time t3', the switch SW1 is opened. Then, when the motor drive instruction signal is given to the controller 6 at time t4 (FIG. 12(*c*)), the same operation as those in FIGS. 1 and 11 which have already been explained is performed.

Thus, when the key switch 7 takes the Start position, the charge to the capacitor C1 is effected. In this case, if the charge is effected only at the Start position which the key switch takes, the charge to the capacitor C1 would be insufficient. Accordingly, the charge is effected during the preset time period ΔT1 when the charge to the capacitor C1 is effected sufficiently, by using as a trigger the fact that the key switch 7 takes the Start position. Incidentally, in this embodiment, when the key switch 7 takes the Start position, the engine is started up, and the key switch 7 is returned back to the ON position without staying at the Start position. Accordingly, unlike the above-described respective examples in which the position of the key switch 7 continuously takes the ON position or the Accessory position, it is unnecessary to periodically charge the power to the capacitor C1.

Figure 13:
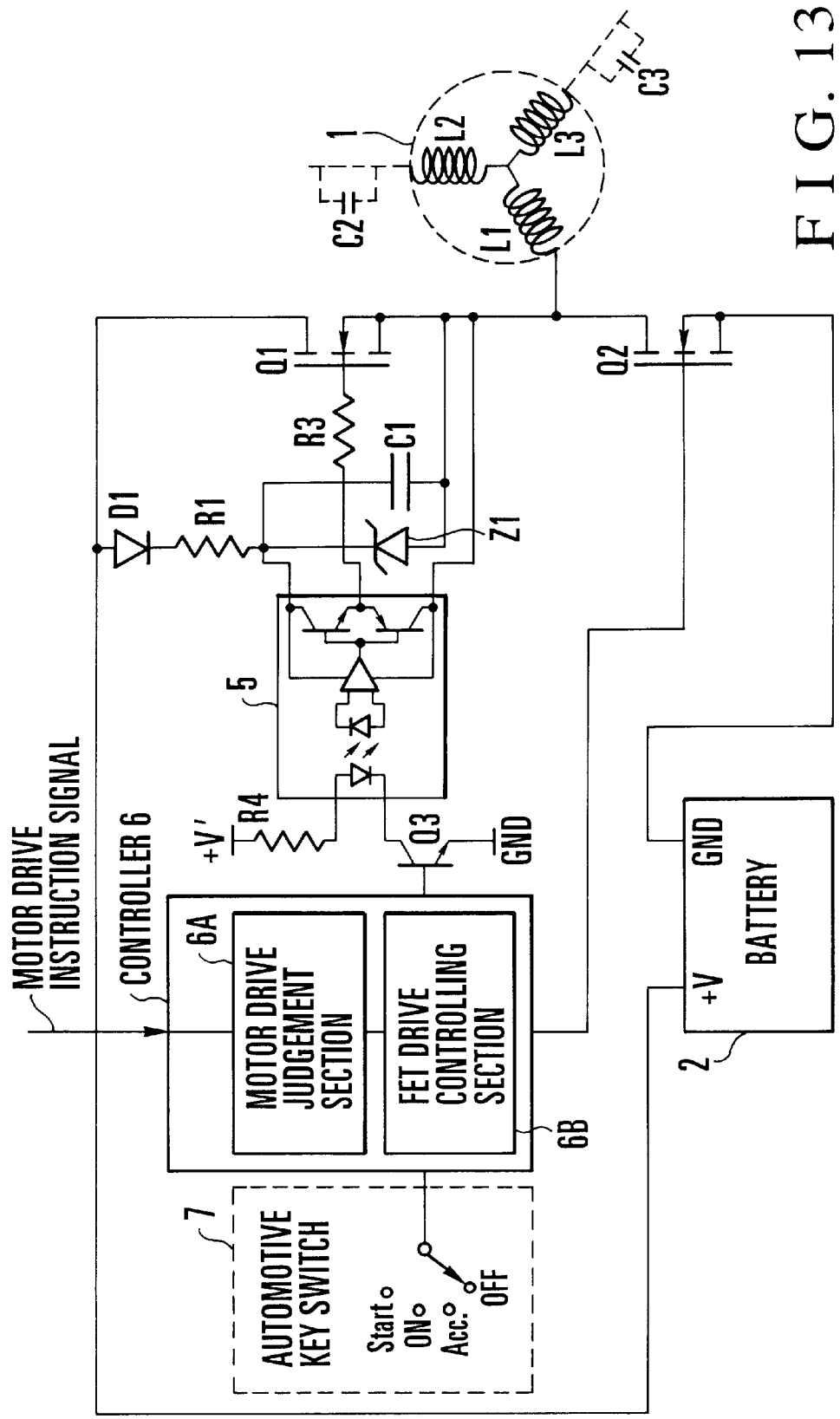
FIG. 13 is a block diagram showing a sixth embodiment of the invention.

Next, FIG. 13 is a block diagram showing a second example of the driver, in which the key switch 7 is continuously connected to the controller 6 to perform the energy accumulation to the capacitor C1 prior to the start-up of the automotive engine. In the driver shown in FIG. 13, the key switch 7 is added to the driver shown in FIG. 3 where the switches SW1 and SW2 are dispensed with.

Figure 14:
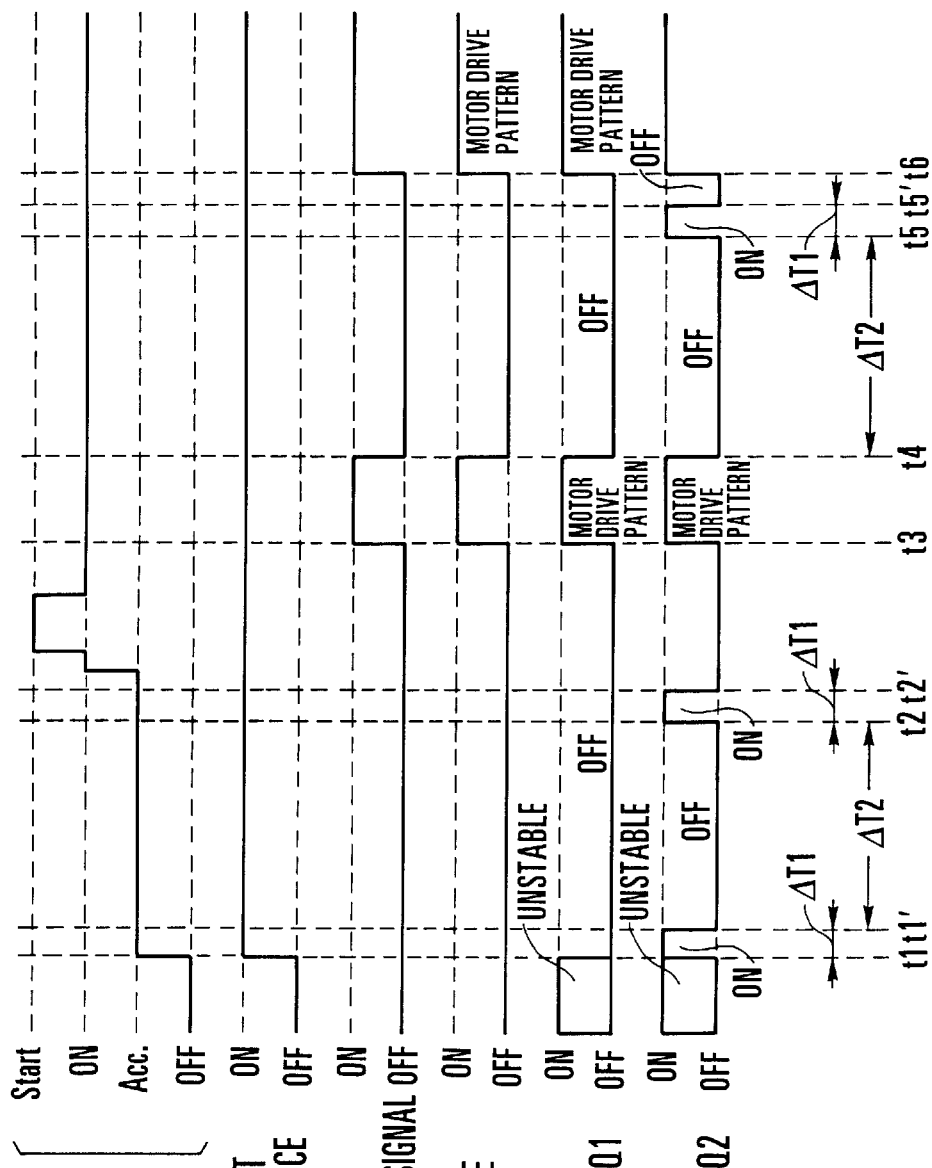
FIG. 14 is a timing chart showing an operation of the apparatus shown in FIG. 13.

The operation of the primary part of the driver shown in FIG. 13 will now be described on the basis of the respective timing charts shown in FIGS. 14 to 16. First of all, the timing chart shown in FIG. 14 will be explained.

First of all, when at time t1, the key switch 7 takes the Accessary position from the OFF position and the power is fed from the battery 2 to the driver (FIGS. 14(a) and 14(b)), the FET drive controlling section 6B only open the lower transistor Q2 during a time period ΔT1 (FIG. 14(f)). Thus, the capacitor C1 is charged. Thereafter, at time t1', the lower transistor Q2 is turned off, and the charge of the capacitor C1 is completed. Then, if a preset time period ΔT2 has lapsed with the key switch 7 being kept at the Accessary position, the FET drive controlling section 6B turns the lower transistor Q2 on during the period ΔT1 (FIG. 14(f)) to thereby again charge the capacitor C1.

Next, when the key switch 7 is brought from the Accessary position through the ON position to the Start position, the engine is started up, and at the same time the power is supplied from the battery 2 to the respective automotive parts. The key switch 7 is returned back to the ON position (FIG. 14(a)). Then, when the motor drive instruction signal is given to the controller 6 at time t3 (FIG. 14(c)), during a time period until t4 at which the motor drive instruction signal is turned off, the controller 6 drives the respective transistors Q1 and Q2 in the motor drive pattern on the basis of the motor drive signal (FIGS. 14(e) and 14(f)). As a result, the motor 1 is driven (FIG. 14(d)).

Thereafter, at time t4, the respective transistors Q1 and Q2 are turned off (FIGS. 14(e) and 14(f)). Then, if the motor drive instruction signal is still turned off even at a time t5 at which the preset time period ΔT2 has lapsed at the time t4 at which the motor drive instruction signal is turned off, only the transistor Q2 is controlled to be turned on to perform the charge to the capacitor 1. At time t5' the switch SW1 is opened (FIG. 14(f)).

Thus, when the key switch 7 takes the Accessary position, the charge is effected in the capacitor C1 so that the motor 1 may be started up immediately after the engine start.

Figure 15:
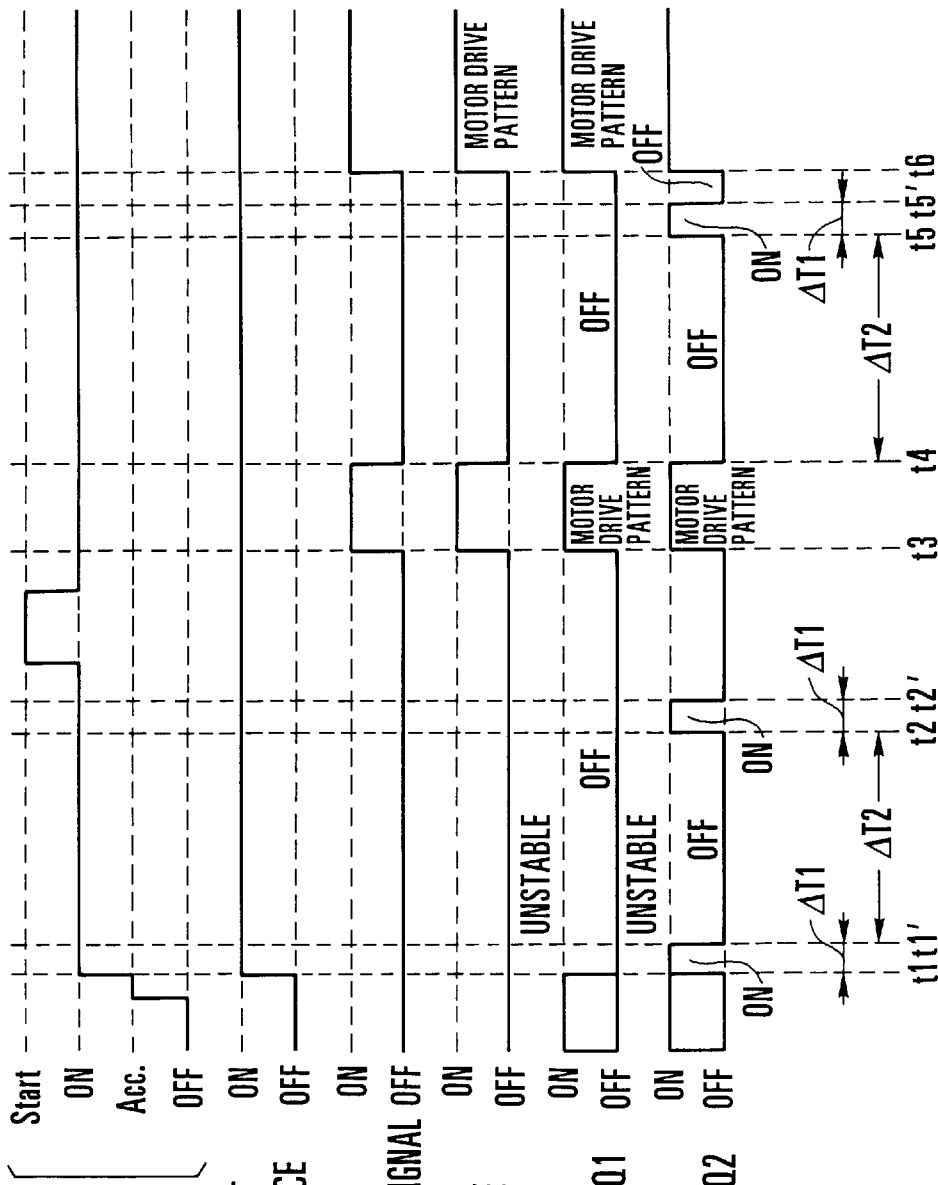
FIG. 15 is another timing chart showing an operation of the apparatus shown in FIG. 13.

Next, the timing chart shown in FIG. 15 shows an operation in the case where the charge is effected to the capacitor C1 when the key switch 7 takes the ON position from the OFF position through the Accessory position. When the key switch 7 takes the ON position at time t1, the power is fed to the driver from the battery 2 (FIGS. 15(a) and 15(b)). In this case, the FET drive controlling section 6B turns off the transistor Q2 during the time period ΔT1 (FIG. 15(f)). Thus, the charge is effected to the capacitor C1. Thereafter, at time t1', the transistor Q2 is turned off and the charge to the capacitor C1 is completed. Then, when the preset time period ΔT2 has lapsed while the key switch 7 is kept at the ON position, the FET drive controlling section 6B turns the transistor Q2 for the time period ΔT1 (FIG. 15(f)), thereby again performing the charge of the capacitor C1.

Next, when the position of the key switch 7 is moved from the ON position to the Start position, the engine is started, the power is fed from the battery 2 to the respective automotive parts, and the key switch 7 is returned back to the ON position (FIG. 15(a)). Then, when the motor drive instruction signal is given to the controller 6 at time t3 (FIG. 15(c)), onward therefrom, the operation that is substantially the same as that of the timing chart shown in FIG. 14 which has already been explained is performed.

When the key switch 7 thus takes the ON position from the Accessory position, the capacitor C1 is charged so that a preparation of the start of the motor 1 is performed prior to the start-up of the engine.

Figure 16:
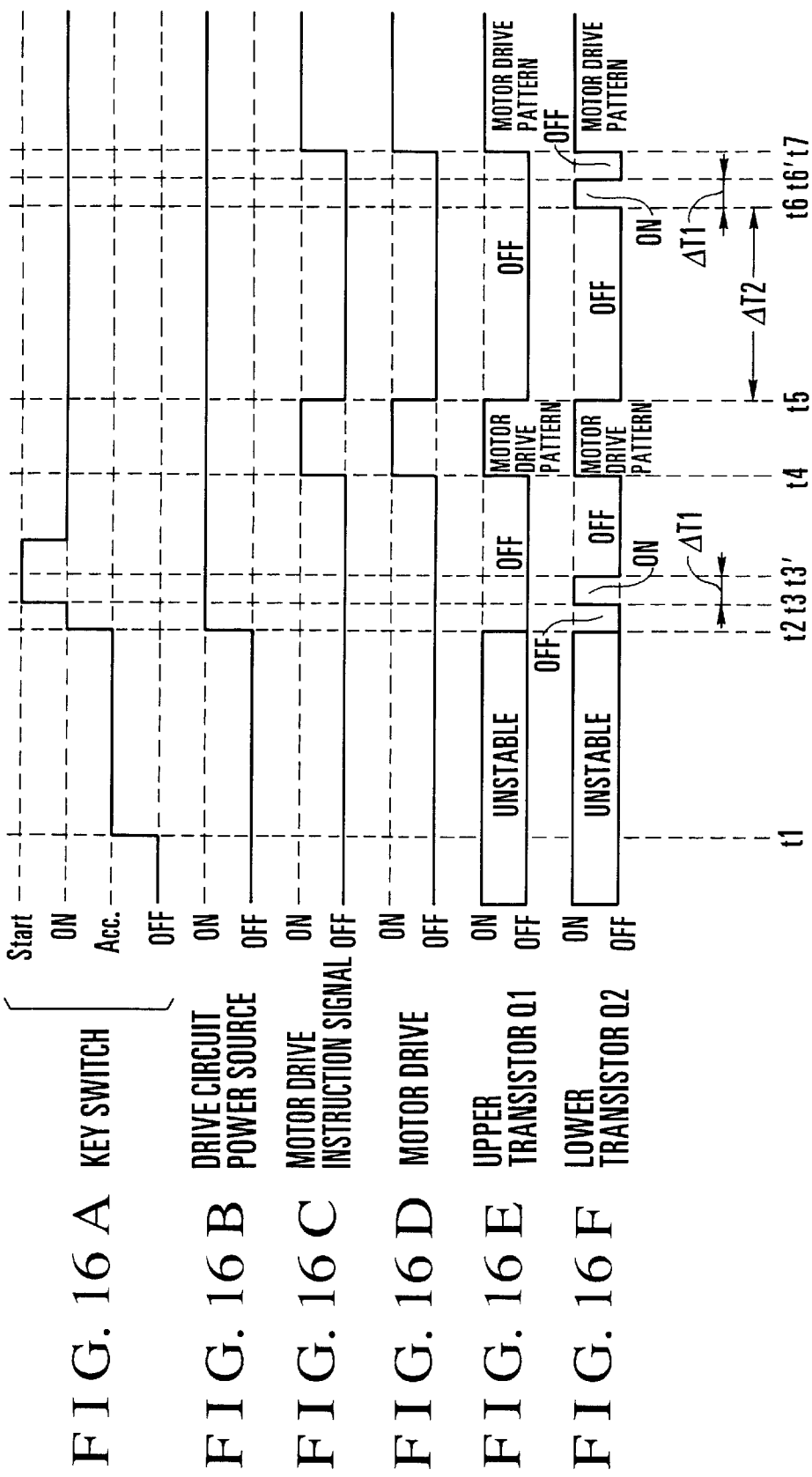
FIG. 16 is yet another timing chart showing an operation of the apparatus shown in FIG. 13.
Figure 17:
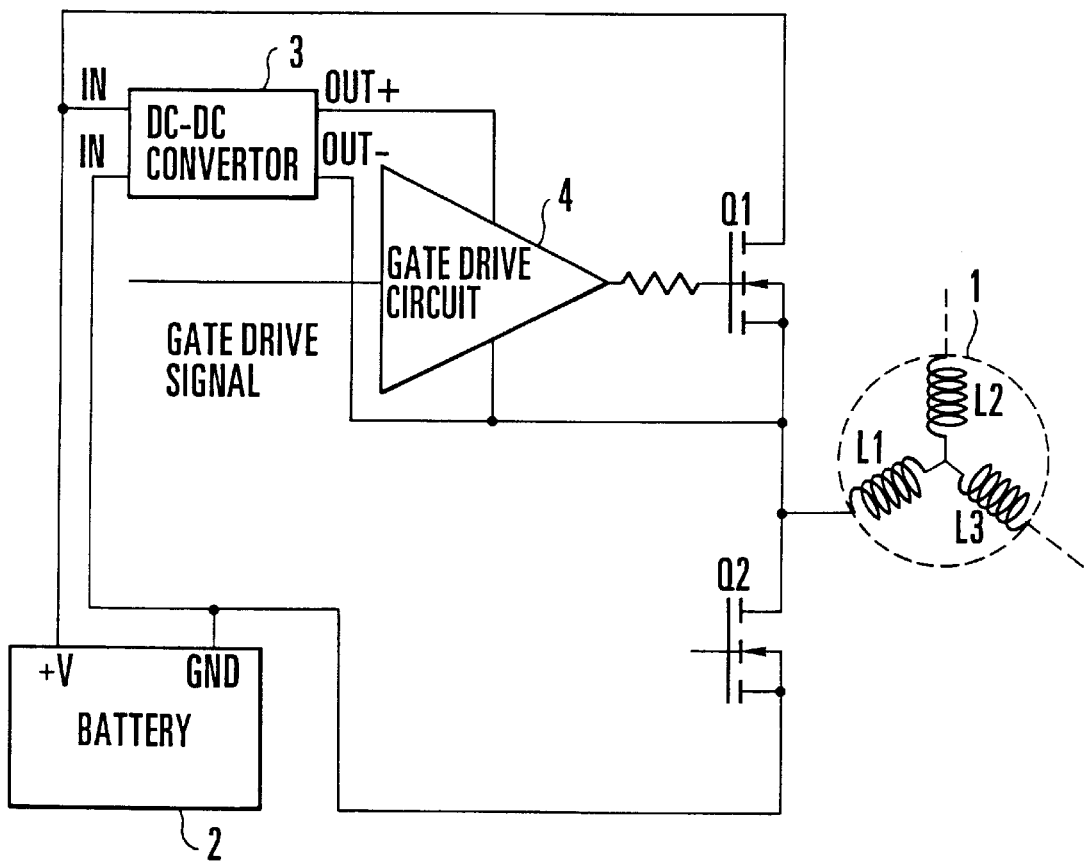
FIG. 17 is a block diagram showing a structure of a conventional apparatus.

Next, the timing chart shown in FIG. 16 shows an operation in the case where there is a predetermined period of time from the OFF position to Accessory position of the key switch 7 and thereafter, the charge is effected to the capacitor C1 when the key switch 7 takes the Start position through the ON position. The key switch 7 takes the Accessory position at time t1. Thereafter, when the key switch takes the ON position at time t2, the power is fed from the battery 2 to the driver (FIGS. 16(a) and 16(b)). Subsequently, the key switch 7 takes the Start position at time t3, the engine is started up, and at the same time the FET drive controlling section 6B closes only the transistor Q2 for the time period ΔT1 (FIG. 16(f)). Thus, the charge is effected to the capacitor C1. Thereafter, at time t3', the transistor Q2 is turned off. Then, when the motor drive instruction signal is given to the controller 6 at time t4 (FIG. 16(c)), the same operation as those in FIGS. 14 and 15 which have already been explained is performed.

Thus, when the key switch 7 takes the Start position, the charge to the capacitor C1 is effected.

As described above, according to the present invention, a capacitor having one terminal connected to the power source is provided, and with the other terminal thereof being set at the ground potential when the upper transistor is turned off which is an object to be controlled to thereby accumulate a drive energy of the upper transistor. Accordingly, it is possible to obtain the sufficient drive energy for turning the upper transistor on from the capacitor without using a DC-DC convertor like a conventional driver. Therefore, it is possible to constitute the driver in a simple and economical manner. Also, it is possible to dispense with the DC-DC convertor to which the power is always fed. It is therefore possible to save the power consumption of the driver.

Also, the driver has the switches in cooperation with the vehicle key switch for starting the automotive engine, and the switches are kept in the closed conditions in response to the vehicle key switch with the other terminal of the capacitor being set at the ground potential for the charge of the capacitor. It is therefore possible to immediately drive the motor after the engine start-up. As a result, it is possible to obtain a suitable power assist immediately after the engine start-up.

Also, for example, in the case where the vehicle key switch is positioned at positions at which the engine inoperative condition is kept for a predetermined time period as in the Accessary position at which the electric power is fed to a part of the electric equipment such as an audio equipment and the ON position at which the power is fed to all the electric parts, the switches are kept in the closed condition. Accordingly, the unnecessary energy is not consumed, and the transistor drive energy may be accumulated in the capacitor for driving the motor.

Also, when the inoperative condition of the brushless motor is kept on after the start-up of the engine for a predetermined time period, the switch is kept in the closed condition. Even if the motor inoperative condition is continued and the drive energy of the capacitor is consumed, it is possible to keep the drive energy for the upper transistor.

Also, since the switch is kept in the closed condition and the other terminal of the capacitor is set at the ground potential at the PWM operation of the lower transistor, it is possible to sufficiently accumulate the drive energy of the upper transistor in the capacitor particularly in the PWM operation of the lower transistor.

Also, the lower transistor is turned on and the other terminal of the capacitor is set at the ground potential in the OFF time of the upper transistor to thereby charge the capacitor, it is possible to accumulate the energy in the capacitor without any special measure.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A method for controlling an electric power pump type power steering system comprising:

providing a current source for coils of a brushless motor coupled to a hydraulic pump of an automotive vehicle, thereby obtaining an assist power;

providing a control voltage source, said control voltage source providing a control voltage higher than a drive voltage of said brushless motor;

providing a plurality of upper transistors and lower transistors, said upper and lower transistors being connected to a set of connection points between each said coil of the brushless motor;

sequentially turning on at least one upper transistor of said plurality of upper transistors by means of a controller for said control voltage source and selectively turning on at least one lower transistor other than said at least one upper transistor which has been turned on, thereby feeding controlled current to the coils for respective phases of said brushless motor;

accumulating drive energy in a capacitor connected at its first terminal to a power source and at its second terminal to each said connection point between the upper and lower transistors and the coils;

wherein when the upper transistor is turned off, said second terminal is set at ground potential such that the drive energy of the upper transistor accumulates in said capacitor; and providing a switch cooperative with an automotive key switch for running an engine of a vehicle, said switch being closed such that the second terminal of the capacitor is set at ground potential during engine start-up.

2. The method according to claim 1, further comprising keeping said switch closed for a predetermined period of time, thereafter opening said switch.

3. The method according to claim 2, further comprising closing the switch when an inoperative condition of the engine persists for a predetermined period of time after the opening of said switch.

4. The method according to claim 2, further comprising closing the switch when an inoperative condition of said brushless motor persists for a predetermined time period after a start-up of the engine.

5. An apparatus for controlling an electric power pump type power steering system comprising:

a brushless motor operative to rotate when a current is fed to the coils of the brushless motor, for driving a hydraulic pump of an automotive vehicle, thereby obtaining an assist power;

a plurality of upper transistors connected to the coils of the brushless motor, said plurality of upper transistors having a control voltage higher than a drive voltage of said brushless motor;

a plurality of lower transistors connected to a set of connection points between each said coil of the brushless motor and said plurality of upper transistors;

a controller operative to sequentially turn on at least one upper transistor of said plurality of upper transistors and to selectively turn on at least one lower transistor other than said at least one upper transistor which has been turned on, thereby feeding controlled current to the coils for respective phases of said brushless motor;

a capacitor connected at its first terminal to a power source and at its second terminal to each said connection point between the upper and lower transistors and the coils, for accumulating a drive energy therein; and a control means for accumulating a drive energy in said capacitor, wherein when the upper transistor is off, the second terminal of said capacitor is set at ground potential by said control means such that the drive energy of the upper transistor accumulates in said capacitor, wherein said control means has a switch cooperative with an automotive key switch for running an engine of a vehicle, said switch connecting to the second terminal of the capacitor, said switch being closed such that the second terminal of the capacitor is set at ground potential.

6. The apparatus according to claim 5, wherein said control means opens said switch after a predetermined period of time.

7. The apparatus according to claim 6, wherein said control means closes said switch when an inoperative condition of the engine persists for a predetermined period of time.

8. The apparatus according to claim 6, wherein said control means closes said switch when an inoperative condition of said brushless motor persists for a predetermined period of time after a start-up of the engine.

9. The apparatus according to claim 5, wherein said control means has a switch cooperative with an automotive key switch for running an engine of a vehicle, said switch connecting to the second terminal of the capacitor, said switch being closed such that the other terminal of said capacitor is set at ground potential when the lower transistors are in PWM operation.

10. The apparatus according to claim 5, wherein said controller is further operative to turn on the lower transistors when the upper transistor is turned off so that the second terminal of said capacitor is set at ground potential to thereby accumulate the drive energy in said capacitor.

11. The apparatus according to claim 5, wherein said controller is further operative to turn off the upper transistor and to turn on the lower transistor in cooperation with an automotive key switch for running an engine of a vehicle.

12. The apparatus according to claim 11, wherein said controller is further operative to turn off the lower transistor after said lower transistor has been turned on after a predetermined period of time.

13. The apparatus according to claim 12, wherein said controller is further operative to turn on the lower transistor when an inoperative condition of the engine persists for a predetermined period of time.

14. The apparatus according to claim 12, wherein said controller is further operative to turn on the lower transistor when an inoperative condition of said brushless motor persists for a predetermined period of time after a start-up of the engine.

* * * * *